(12) United States Patent
Fujimoto et al.

(10) Patent No.: US 8,877,854 B2
(45) Date of Patent: *Nov. 4, 2014

(54) REINFORCED THERMOPLASTIC RESIN COMPOSITION AND MOLDED ARTICLE

(75) Inventors: Iwao Fujimoto, Ube (JP); Emiko Fujimoto, legal representative, Ube (JP); Koichi Tezuka, Ube (JP); Masahito Nakamoto, Ube (JP)

(73) Assignee: UMG ABS, Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/810,400

(22) PCT Filed: Dec. 26, 2008

(86) PCT No.: PCT/JP2008/073755
§ 371 (c)(1),
(2), (4) Date: Jun. 24, 2010

(87) PCT Pub. No.: WO2009/084638
PCT Pub. Date: Jul. 9, 2009

(65) Prior Publication Data
US 2010/0273922 A1     Oct. 28, 2010

(30) Foreign Application Priority Data
Dec. 27, 2007  (JP) .............................. P2007-338093

(51) Int. Cl.
| | |
|---|---|
| C08L 69/00 | (2006.01) |
| C08L 67/00 | (2006.01) |
| C08L 67/02 | (2006.01) |
| C08L 63/00 | (2006.01) |
| C08L 55/02 | (2006.01) |
| C08L 51/04 | (2006.01) |
| C08L 25/12 | (2006.01) |
| C08K 3/00 | (2006.01) |
| C08K 5/521 | (2006.01) |

(52) U.S. Cl.
CPC ................. *C08L 67/02* (2013.01); *C08L 51/04* (2013.01); *C08K 3/0033* (2013.01); *C08L 25/12* (2013.01); *C08L 2205/03* (2013.01); *C08L 67/00* (2013.01); *C08L 55/02* (2013.01); *C08L 69/00* (2013.01); *C08L 63/00* (2013.01); *C08K 5/521* (2013.01)
USPC ............................. 524/504; 524/115; 524/145

(58) Field of Classification Search
CPC ......... C08L 69/00; C08L 67/02; C08L 51/04; C08L 25/12; C08L 67/00; C08L 63/00; C08L 55/02; C08L 2205/03; C08L 2666/02
USPC ........................................ 524/115, 504, 145
See application file for complete search history.

(56) References Cited

U.S. PATENT DOCUMENTS

| 5,871,570 A | * | 2/1999 | Koyama et al. ............ 106/18.18 |
| 6,369,142 B1 | * | 4/2002 | Nodera et al. ................ 524/141 |
| 7,135,509 B2 | | 11/2006 | Ishii et al. |
| 2002/0115789 A1 | | 8/2002 | Nodera et al. |
| 2004/0063824 A1 | | 4/2004 | Takagi et al. |
| 2004/0127611 A1 | | 7/2004 | Yamanaka et al. |
| 2010/0273922 A1 | | 10/2010 | Fujimoto et al. |

FOREIGN PATENT DOCUMENTS

| CN | 1513028 A | 7/2004 |
| JP | 6049344 A | 2/1994 |
| JP | 8269313 A | 10/1996 |
| JP | 8302177 A | 11/1996 |
| JP | 8319406 A | 12/1996 |
| JP | 10158498 A | 6/1998 |
| JP | 2000103950 A | 4/2000 |
| JP | 2000349486 A | 12/2000 |
| JP | 2001240738 A | 9/2001 |
| JP | 2002047428 A | 2/2002 |
| JP | 2003034749 A | 2/2003 |
| JP | 2003147154 A | 5/2003 |
| JP | 2003327639 A | 11/2003 |
| JP | 2004115605 A | 4/2004 |
| JP | 2004138979 A | 5/2004 |
| JP | 2006063110 A | 3/2006 |
| JP | 2006342196 A | 12/2006 |
| TW | 200402446 A | 2/2004 |

OTHER PUBLICATIONS

International Search Report; PCT/JP2008/073755; Mar. 12, 2009; 2 pages.
International Search Report; PCT/JP2008/073758; Mar. 13, 2009; 2 pages.

(Continued)

*Primary Examiner* — Angela C Scott
(74) *Attorney, Agent, or Firm* — St. Onge Steward Johnston & Reens LLC

(57) ABSTRACT

The present invention relates to a reinforced thermoplastic resin composition having excellent moldability, processability, and mechanical strengths, as well as being capable of improving the drop impact resistance (surface impact strength determined by a falling ball test). The reinforced thermoplastic resin composition of the present invention includes 10 to 60% by mass of a graft copolymer (A) having a graft chain (A2) grafted to a rubber polymer (A1); 40 to 90% by mass of a matrix polymer (B) which includes one or more types of polymers selected from the group consisting of a vinyl-based copolymer (B-1), a polycarbonate resin (B-2), and a polyester resin (B-3); 0.1 to 50 parts by mass of an inorganic filler (D); and 0.5 to 20 parts by mass of a glycidyl ether unit-containing polymer (E) having a mass average molecular weight of 3,000 to 200,000.

9 Claims, No Drawings

(56) References Cited

OTHER PUBLICATIONS

Official Letter from the Intellectual Property Bureau Ministry of Economic Affairs; Application No. TW 097150941; Issued: Jun. 8, 2012; Mailing Date: Jun. 12, 2012; 8 pages.
Official Letter from the Intellectual Property Bureau Ministry of Economic Affairs; Application No. 097150936; Issued: Jun. 21, 2012; Mailing Date: Jun. 25, 2012; 9 pages.
Official Letter from the Intellectual Property Bureau Ministry of Economic Affairs; Application No. TW 097150941; Issued: Sep. 6, 2012; Mailing Date: Jun. 12, 2012; 8 pages.
Official Letter from the Intellectual Property Bureau Ministry of Economic Affairs; Application No. 097150936; Issued: Jun. 19, 2012; Mailing Date: Sep. 25, 2012; 9 pages.
US Office Action U.S. Appl. No. 12/810,409 Mailing Date: Apr. 1, 2013 15 pages.
Notice of Reasons for Rejection from Japan Application No. 2007-338093 Mailing Date: Feb. 25, 2014 6 pages.

* cited by examiner

US 8,877,854 B2

REINFORCED THERMOPLASTIC RESIN COMPOSITION AND MOLDED ARTICLE

TECHNICAL FIELD

The present invention relates to a reinforced thermoplastic resin composition and a molded article for use as materials of a housing of a laptop personal computer, a portable device, or the like.

Priority is claimed on Japanese Patent Application No. 2007-338093, filed Dec. 27, 2007, the content of which is incorporated herein by reference.

BACKGROUND ART

Some thermoplastic resin compositions such as flame-retardant ABS and flame-retardant PC/ABS, or reinforced thermoplastic resin compositions made by reinforcing such thermoplastic resin compositions with fibers, are used as raw materials of a housing of electronic equipment such as a laptop personal computer and a portable device. Usually, these resin compositions are molded into a housing by means of injection molding, which is highly flexible about the shape of molded articles.

In recent years, a demand for electronic equipment to be thinner and more lightweight is getting stricter, and also a demand to be endurable against impacts and loadings while sitting inside a bag or such a container is being raised. In order to satisfy these demands, the resin used for a housing has to have not only high rigidity and impact resistance, but also high drop impact resistance.

By the way, it is known that the drop impact resistance is highly correlated with the surface impact strength measured by a falling ball test, but not so much correlated with the Izod impact strength or the Charpy impact strength. For this reason, improvements in the Izod impact strength and the Charpy impact strength may not lead to an improvement in the drop impact resistance.

Among conventionally employed housing materials for electronic equipment, non-reinforced flame-retardant ABS resins and flame-retardant PC/ABS resins have low rigidity and thus are not able to meet the recent demand of thickness reduction. In addition, glass fiber-reinforced resin compositions are not sufficient in the balance between the rigidity and the weight. For this reason, carbon fiber-reinforced thermoplastic resin compositions are now being reviewed as housing materials for electronic equipment.

However, conventional carbon fiber-reinforced thermoplastic resin compositions are brittle and involve an easy-to-break drawback for use as a housing material, although they are able to achieve high rigidity and lighter weight. As a means for overcoming this drawback, there is proposed a method in which a carboxyl group-containing olefin-based wax, or the like, is mixed in a carbon fiber-reinforced polycarbonate resin (Patent Document 1). This method described in Patent Document 1, however, involves a drawback in that the impact resistance can be improved whereas other mechanical strengths are impaired.

Moreover, in order to improve the mechanical strengths, there are proposed a method in which a silane coupling agent and an epoxy compound are used as a fiber shrinking agent for a fiber-reinforced resin composition (Patent Document 2), and a method in which an epoxy resin is added afterward (Patent Document 3). However, these methods described in Patent Documents 2 and 3 did not improve the impact resistance.

In addition, in order to improve the flame retardancy and the mechanical strengths, there are many proposals to add an epoxy compound; however, there is no proposal about a reinforced thermoplastic resin composition having improved drop impact resistance while maintaining the mechanical strengths.

Furthermore, housings of electronic equipment need to have an electromagnetic interference shielding ability (hereunder, referred to as "EMI shielding ability"). Regarding a method for providing the EMI shielding ability, usually, there are enumerated: a method in which a resin containing 10 to 20% by mass or more of a carbon fiber is used; a method in which a metallic foil or a metallic plate is inserted during the inmolding or product assembling process; a method in which a nonelectrolytic plating or a conductive coating is applied; and a method in which a magnesium alloy is used as a housing material. Of these, the method in which a magnesium alloy is used as a housing material is taking over the mainstream.

In addition, magnesium alloys are advantageous as they can achieve higher rigidity, higher strength, and lighter weight. However, magnesium alloys require time and labor for secondary processing, as well as involving a problem in that the flexibility about the shape is so limited that they are only applicable to simple shapes.

Patent Document 1: Japanese Laid-Open Patent Application No. 2001-240738

Patent Document 2: Japanese Unexamined Patent Application, First Publication No. H06-49344

Patent Document 3: Japanese Laid-Open Patent Application No. 2006-63110

DISCLOSURE OF INVENTION

It is an object of the present invention to provide a reinforced thermoplastic resin composition having excellent moldability, processability, and mechanical strengths, as well as being capable of improving the drop impact resistance (surface impact strength determined by a falling ball test), and to provide a molded article formed of such a resin composition.

The present invention includes the following aspects.

[1] A reinforced thermoplastic resin composition including:
  10 to 60% by mass of a graft copolymer (A) in which a graft chain (A2) containing an aromatic alkenyl compound monomer unit (a) and a vinyl cyanide compound monomer unit (b) is grafted to a rubber polymer (A1);
  40 to 90% by mass of a matrix polymer (B) which includes one or more types of polymers selected from the group consisting of a vinyl-based copolymer (B-1) containing an aromatic alkenyl compound monomer unit (a) and a vinyl cyanide compound monomer unit (b), a polycarbonate resin (B-2), and a polyester resin (B-3) (provided that the total amount of the component of (A) and the component of (B) accounts for 100% by mass);
  0.1 to 50 parts by mass of an inorganic filler (D) relative to 100 parts by mass of the total amount of the graft copolymer (A) and the matrix polymer (B); and
  0.5 to 20 parts by mass of a glycidyl ether unit-containing polymer (E) which includes a glycidyl ether unit and has a mass average molecular weight of 3,000 to 200,000.

[2] A reinforced thermoplastic resin composition including:
  10 to 40% by mass of a graft copolymer (A) in which a graft chain (A2) containing an aromatic alkenyl compound monomer unit (a) and a vinyl cyanide compound monomer unit (b) is grafted to a rubber polymer (A1);
  60 to 90% by mass of a matrix polymer (B) which includes one or more types of polymers selected from the group consisting of a vinyl-based copolymer (B-1) containing an aromatic alkenyl compound monomer unit (a) and a vinyl cyanide compound monomer unit (b), a polycarbonate resin (B-2), and a polyester resin (B-3) (provided that the total amount of the component of (A) and the component of (B) accounts for 100% by mass);

0.1 to 50 parts by mass of an inorganic filler (D) relative to 100 parts by mass of the total amount of the graft copolymer (A) and the matrix polymer (B);

0.5 to 20 parts by mass of a glycidyl ether unit-containing polymer (E) which includes a glycidyl ether unit and has a mass average molecular weight of 3,000 to 200,000; and 0.1 to 40 parts by mass of a phosphate ester-based flame-retardant agent (F).

[3] The reinforced thermoplastic resin composition according to [2], wherein the molecular weight of the phosphate ester-based flame-retardant agent (F) is higher than 326 and lower than 692.

[4] A reinforced thermoplastic resin composition according to any one of [1] to [3], wherein the inorganic filler (D) is a carbon fiber.

[5] A molded article formed through molding processing of the reinforced thermoplastic resin composition according to any one of [1] to [4].

Effects of the Invention

The reinforced thermoplastic resin composition of the present invention has excellent moldability, processability, and mechanical strengths, as well as being capable of improving the drop impact resistance (impact strength determined by a falling ball test) of the molded article.

The molded article of the present invention has excellent processability and mechanical strengths, as well as having high drop impact resistance (impact strength determined by a falling ball test).

BEST MODE FOR CARRYING OUT THE INVENTION

Non-Flame-retardant Type Reinforced Thermoplastic Resin Composition

A non-flame-retardant type reinforced thermoplastic resin composition serving as a first embodiment example of the present invention includes a graft copolymer (A), a matrix polymer (B), an inorganic filler (D), and a glycidyl ether unit-containing polymer (E). In this description, a component including the graft copolymer (A) and the matrix polymer (B) is referred to as a resin main component (C).

(Graft Copolymer (A))

The graft copolymer (A) is made by grafting a graft chain (A2) to a rubber polymer (A1).

[Rubber Polymer (A1)]

Examples of the rubber polymer (A1) can include a butadiene rubber, a styrene-butadiene rubber, an acrylonitrile-butadiene rubber, an isoprene rubber, a chloroprene rubber, a butyl rubber, an ethylene-propylene rubber, an ethylene-propylene-nonconjugated diene rubber, an acrylic rubber, an epichrolohydrin rubber, a diene-acrylic composite rubber, and a silicone (polysiloxane)-acrylic composite rubber. Of these, preferred are a butadiene rubber, a styrene-butadiene rubber, an acrylonitrile-butadiene rubber, an acrylic rubber, a diene-acrylic composite rubber, and a silicone-acrylic composite rubber as they offer excellent plating ability of the molded article formed from the thermoplastic resin composition.

Here, the diene component of the diene-acrylic composite rubber contains butadiene units at 50% by mass or more. Specific examples thereof include a butadiene rubber, a styrene-butadiene rubber, an acrylonitrile-butadiene rubber, or the like.

The acrylic rubber component of the diene-acrylic composite rubber is made by polymerization between an alkyl (meth)acrylate (g) and a polyfunctional monomer (h).

Here, examples of the alkyl (meth)acrylate (g) can include: methyl acrylate, ethyl acrylate, n-propyl acrylate, n-butyl acrylate, 2-ethylhexyl acrylate, and such alkyl acrylates; and hexyl methacrylate, 2-ethylhexyl methacrylate, n-lauryl methacrylate, and such alkyl methacrylates. Either a single kind or a combination of plural kinds of them may be used.

Examples of the polyfunctional monomer (h) can include allyl methacrylate, ethylene glycol dimethacrylate, propylene glycol dimethacrylate, 1,3-butylene glycol dimethacrylate, 1,4-butylene glycol dimethacrylate, triallyl cyanurate, triallyl isocyanurate, or the like. Either a single kind or a combination of plural kinds of them may be used.

The composite structure of the diene-acrylic composite rubber can be exemplified by a core-shell structure in which a core layer of a diene-based rubber is covered by an alkyl (meth)acrylate-based rubber, a core-shell structure in which a core layer of an alkyl (meth)acrylate-based rubber is covered by a diene-based rubber, a structure in which a diene-based rubber and an alkyl (meth)acrylate-based rubber are entangled with each other, a copolymer structure in which diene-based monomer units and alkyl (meth)acrylate-based monomer units are randomly arranged, and the like.

The silicone component of the silicone-acrylic composite rubber is mainly composed of a polyorganosiloxane. Of these, preferred is a polyorganosiloxane containing a vinyl polymerizable functional group. The acrylic rubber component of the silicone-acrylic composite rubber is similar to the acrylic rubber component of the diene-acrylic composite rubber.

The composite structure of the silicone-acrylic composite rubber can be exemplified by a core-shell structure in which a core layer of a polyorganosiloxane rubber is covered by an alkyl (meth)acrylate-based rubber, a core-shell structure in which a core layer of an alkyl (meth)acrylate-based rubber is covered by a polyorganosiloxane rubber, a structure in which a polyorganosiloxane rubber and an alkyl (meth)acrylate-based rubber are entangled with each other, a structure in which polyorganosiloxane segments and polyalkyl (meth)acrylate segments are linearly and sterically bound to each other to form a networked rubber structure, and the like.

The rubber polymer (A1) is prepared by, for example, treating the monomers constituting the rubber polymer (A1) with a radical polymerization initiator to effect emulsion polymerization. The particle diameter of the rubber polymer (A1) can be readily controlled according to the preparation method using emulsion polymerization.

The average particle diameter of the rubber polymer (A1) is preferably from 0.1 to 0.6 μm as the impact resistance of the reinforced thermoplastic resin composition can be improved.

In addition, the content of the rubber polymer (A1) is preferably from 5 to 25% by mass, provided that the resin main component (C) accounts for 100% by mass. If the content of the rubber polymer (A1) is 5% by mass or higher, the impact resistance of the reinforced thermoplastic resin composition will be improved. If the content is 25% by mass or lower, the moldability will be improved. For this reason, the molded article will have excellent appearance.

[Graft Chain (A2)]

The graft chain (A2) grafted to the rubber polymer (A1) includes an aromatic alkenyl compound monomer unit (a) and a vinyl cyanide compound monomer unit (b) as essential components, and a monomer unit (c) which is copolymerizable to these components as an optional component. The composition ratio thereof is not specifically limited, although it is preferable such that the aromatic alkenyl compound monomer unit (a) accounts for 50 to 90% by mass, the vinyl cyanide compound monomer unit (b) accounts for 10 to 50% by mass, and the monomer unit (c) accounts for 0 to 40% by mass (provided that the total amount of (a), (b), and (c) accounts for 100% by mass), as such a ratio offers an excellent balance between the impact resistance and the molding processability.

Examples of the aromatic alkenyl compound monomer unit (a) can include styrene, α-methylstyrene, vinyltoluene, or the like. Preferred is styrene.

Examples of the vinyl cyanide compound monomer unit (b) can include acrylonitrile, methacrylonitrile, or the like. Preferred is acrylonitrile.

The monomer unit (c) which is copolymerizable to these components can be exemplified by methacrylic acid esters such as methyl methacrylate, ethyl methacrylate, and 2-ethylhexyl methacrylate, acrylic esters such as methyl acrylate, ethyl acrylate, and butyl acrylate, maleimide compounds such as N-phenylmaleimide, and the like.

Moreover, preferably, the graft copolymer (A) contains 70 to 99% by mass of an acetone-insoluble matter, and the reduced viscosity of an acetone-soluble matter is 0.30 to 0.70 dl/g in a 0.2 g/dl N,N-dimethylformamide solution at 25° C. If the acetone-insoluble matter accounts for 70% by mass or more, the appearance of the molded product and the molding processability of the reinforced thermoplastic resin composition will be improved. On the other hand, if the acetone-insoluble matter accounts for 99% by mass or less, the tear strength of the reinforced thermoplastic resin composition will be improved.

Furthermore, if the reduced viscosity of the acetone-soluble matter in a 0.2 g/dl N,N-dimethylformamide solution at 25° C. is 0.30 dl/g or higher, the tear strength of the reinforced thermoplastic resin composition will be improved. If it is 0.70 dl/g or lower, the appearance of the molded product and the molding processability of the reinforced thermoplastic resin composition will be more improved.

Here, the acetone-soluble matter is a polymer which is similar to the graft chain (A2) but not grafted to the rubber polymer (A1). This acetone-soluble matter is often generated at the same time when the graft chain (A2) is being grafted to the rubber polymer (A1).

[Production Method of Graft Copolymer (A)]

The graft copolymer (A) is produced by graft-polymerizing the aromatic alkenyl compound monomer (a) and the vinyl cyanide compound monomer (b), and, if necessary, an additional monomer (c), onto the rubber polymer (A1). The production method of the graft copolymer (A) is preferably, but not limited to, emulsion polymerization. In addition, various chain transfer agents may be also added during the graft polymerization, so as to adjust the molecular weight and the graft rate of the graft copolymer (A).

[Blending Amount of Graft Copolymer (A)]

The content of the graft copolymer (A) in the resin main component (C) is from 10 to 60% by mass, and preferably from 25 to 50% by mass (provided that the total amount of the component (A) and the component (B) accounts for 100% by mass). If the content of the graft copolymer (A) is 10% by mass or higher, the impact resistance of the reinforced thermoplastic resin composition will be improved. If the content of the graft copolymer (A) is 60% by mass or lower, the molding processability of the reinforced thermoplastic resin composition will be improved.

(Matrix Polymer (B))

The matrix polymer (B) includes one or more types of polymers selected from the group consisting of a vinyl-based copolymer (B-1), a polycarbonate resin (B-2), and a polyester resin (B-3).

[Vinyl-Based Copolymer (B-1)]

The vinyl-based copolymer (B-1) consists of an aromatic alkenyl compound monomer unit (a) and a vinyl cyanide compound monomer unit (b), and, if necessary, an additional vinyl-based monomer unit (c) which is copolymerizable to them.

Specific examples of the vinyl-based copolymer (B-1) can include a styrene-acrylonitrile copolymer (SAN resin), an α-methylstyrene-acrylonitrile copolymer, a styrene-α-methylstyrene-acrylonitrile copolymer, a styrene-acrylonitrile-methyl methacrylate copolymer, a styrene-acrylonitrile-N-phenylmaleimide copolymer, a styrene-acrylonitrile-maleic anhydride copolymer, or the like.

The content of the aromatic alkenyl compound monomer unit (a) in the vinyl-based copolymer (B-1) is preferably within a range of 50 to 90% by mass, and more preferably within a range of 60 to 80% by mass.

The content of the vinyl cyanide compound monomer unit (b) in the vinyl-based copolymer (B-1) is preferably within a range of 10 to 50% by mass, and more preferably within a range of 20 to 40% by mass.

If the content of the aromatic alkenyl compound monomer unit (a) is 50% by mass or higher, or alternatively, if the content of the vinyl cyanide compound monomer unit is 50% by mass or lower, excellent molding processability will be given.

If the content of the aromatic alkenyl compound monomer unit (a) is 90% by mass or lower, or alternatively, if the content of the vinyl cyanide compound monomer unit is 10% by mass or higher, excellent impact resistance will be given.

In addition, if an additional vinyl-based monomer unit (c) is included, its content is desirably 40% by mass or lower. If the content of the additional vinyl-based monomer unit (c) is 40% by mass or lower, the molding processability of the reinforced thermoplastic resin composition will be improved.

The reduced viscosity of the vinyl-based copolymer (B-1) is preferably from 0.4 to 1.4 dl/g when measured in a 0.2 g/dl N,N-dimethylformamide solution at 25° C. If the reduced viscosity of the acetone-soluble matter in a 0.2 g/dl N,N-dimethylformamide solution at 25° C. is 0.4 dl/g or higher, the tear strength of the reinforced thermoplastic resin composition will be improved. If it is 1.4 dl/g or lower, the appearance of the molded product and the molding processability of the reinforced thermoplastic resin composition will be more improved.

[Polycarbonate Resin (B-2)]

The polycarbonate resin (B-2) is obtained from a dihydroxydiarylalkane, and may be optionally branched.

The polycarbonate resin (B-2) is produced by a known method. For example, this can be produced by reacting a dihydroxy or polyhydroxy compound with phosgene or a carbonate diester.

As for the dihydroxydiarylalkane, for example, a compound having an alkyl group at the ortho position relative to the hydroxy group can be used. Preferred specific examples of the dihydroxydiarylalkane can include 4,4-dihydroxy 2,2-diphenylpropane (that is, bisphenol A), tetramethyl bisphenol A, bis-(4-hydroxyphenyl)-p-diisopropylbenzene, or the like.

Moreover, the branched polycarbonate is produced by, for example, substituting a part, such as 0.2 to 2 mole %, of the dihydroxy compound with polyhydroxy. Specific examples of the polyhydroxy compound can include phloroglucinol, 4,6-dimethyl-2,4,6-tri-(4-hydroxyphenyl)-heptene, 4,6-dimethyl-2,4,6-tri-(4-hydroxyphenyl)-heptane, 1,3,5-tri-(4-hydroxyphenyl)-benzene, or the like.

The viscosity average molecular weight (Mv) of the polycarbonate resin (B-2) is preferably from 15,000 to 35,000. If the viscosity average molecular weight of the polycarbonate resin (B-2) is 15,000 or higher, the impact resistance of the reinforced thermoplastic resin composition will be improved. If the viscosity average molecular weight of the polycarbonate resin (B-2) is 35,000 or lower, the moldability of the reinforced thermoplastic resin composition will be improved.

In addition, the viscosity average molecular weight (Mv) of the polycarbonate resin (B-2) is preferably from 17,000 to 25,000, as such a range offers a particularly superior balance of the mechanical strengths, the falling ball impact strength, and the fluidity.

[Polyester Resin (B-3)]

The polyester resin (B-3) mainly consists of an aromatic dicarboxylic acid unit of 8 to 22 carbon atoms and either an alkylene glycol unit of 2 to 22 carbon atoms or a cycloalkylene glycol unit, wherein the total amount of these component units accounts for 50% by mass or higher. In addition, the polyester resin (B-3) may also contain, if necessary, an aliphatic dicarboxylic acid such as adipic acid and sebacic acid, or a polyalkylene glycol such as polyethylene glycol and polytetramethylene glycol, as a component unit.

Preferred examples of the polyester resin (B-3) can include polyethylene terephthalate, polybutylene terephthalate, polytetramethylene terephthalate, polybutylene naphthalate, or the like. Either a single kind or a combination of plural kinds of these polyester resins may be used.

[Composition of Matrix Polymer (B)]

The matrix polymer (B) may include either a single kind or a combination of plural kinds of the vinyl-based copolymer (B-1), the polycarbonate resin (B-2), and the polyester resin (B-3). Examples thereof can include: combinations of two kinds of polymers such as a combination of the SAN resin (B-1) and the polycarbonate resin (B-2), a combination of the SAN resin (B-1) and the polyester resin (B-3), and a combination of the polycarbonate resin (B-2) and the polyester resin (B-3); and combinations of three kinds of polymers such as a combination of the SAN resin (B-1), the polycarbonate resin (B-2), and the polyester resin (B-3). Of these, preferred are: the combination of the SAN resin (B-1) and the polycarbonate resin (B-2); and the combination of the SAN resin (B-1), the polycarbonate resin (B-2), and the polyester resin (B-3), as such a combination offers an excellent balance of the impact resistance, the moldability, and the surface appearance.

The content of the matrix polymer (B) in the resin main component (C) is from 40 to 90% by mass, preferably from 60 to 90% by mass, and more preferably from 60 to 80% by mass (provided that the total amount of the component (A) and the component (B) accounts for 100% by mass). If the content of the matrix polymer (B) is 40% by mass or higher, the impact resistance of the reinforced thermoplastic resin composition will be improved. If the content of the matrix polymer (B) is 90% by mass or lower, the molding processability of the reinforced thermoplastic resin composition will be improved. Even if the matrix polymer (B) includes a combination of plural kinds of polymers, the content of the matrix polymer (B) in the resin main component (C) is from 40 to 90% by mass (provided that the total amount of the component (A) and the component (B) accounts for 100% by mass).

If the matrix polymer (B) includes a combination of plural kinds of polymers, the vinyl-based copolymer (B-1), the polycarbonate resin (B-2), and the polyester resin (B-3) are preferably within the following composition ratio.

If the matrix polymer (B) includes the combination of the SAN resin (B-1) and the polycarbonate resin (B-2), it is preferable that the SAN resin (B-1) accounts for 1 to 65% by mass and the polycarbonate resin (B-2) accounts for 35 to 99% by mass (provided that the total amount of the component (B-1) and the component (B-2) accounts for 100% by mass).

If the matrix polymer (B) includes the combination of the SAN resin (B-1), the polycarbonate resin (B-2), and the polyester resin (B-3), it is preferable that the SAN resin (B-1) accounts for 1 to 69% by mass, the polycarbonate resin (B-2) accounts for 30 to 98% by mass, and the polyester resin (B-3) accounts for 1 to 69% by mass (provided that the total amount of the component (B-1), the component (B-2), and the component (B-3) accounts for 100% by mass).

The respective components within such a range offer a better balance of the molding processability and the mechanical strengths of the reinforced thermoplastic resin composition.

(Inorganic Filler (D))

Examples of the inorganic filler (D) can include inorganic fibers such as glass fibers and carbon fibers, metal-coated inorganic fibers, wollastonite, talc, mica, glass flakes, glass beads, potassium titanate, calcium carbonate, magnesium carbonate, carbon black, Ketjen Black, and such inorganic substances, iron, copper, zinc, aluminum, and such metals, alloys, and oxides thereof in forms of fibers and powders. Of these, carbon fibers are preferred since even a small content thereof can offer high rigidity.

Either a single kind or a combination of plural kinds of these inorganic fillers may be used.

The surface of the inorganic filler (D) may be treated with a finishing agent such as a coupling agent (for example, a silane-based coupling agent and a titanate-based coupling agent).

In addition, the glass fibers or the carbon fibers may be bundled or coated with an ethylene-vinyl acetate copolymer or such a thermoplastic resin, a polyurethane resin, an epoxy resin or such a thermosetting resin.

The content of the inorganic filler (D) is from 0.1 to 50 parts by mass and preferably from 5 to 30 parts by mass, relative to 100 parts by mass of the resin main component (C). If the content of the inorganic filler (D) is 0.1 part by mass or higher, the rigidity and such properties can be sufficiently improved. If the content of the inorganic filler (D) is 50 parts by mass or lower, better moldability will be given.

(Glycidyl Ether Unit-containing Polymer (E))

The glycidyl ether unit-containing polymer (E) is a polymer having a glycidyl ether unit.

Examples of the glycidyl ether unit-containing polymer (E) can include glycidyl ether type epoxy resins yielded by a reaction between a compound having a hydroxy group and epichlorohydrin.

The glycidyl ether type epoxy resin can be exemplified by high molecular weight substances such as bisphenol type epoxy resins, novolac type epoxy resins, polyglycidyl ethers of aliphatic polyhydric alcohols, and biphenyl type epoxy resins, which have a polymer of repetitive units represented by the following formula (1) (for example, an epoxy group-containing phenoxy resin).

Furthermore, the bisphenol type epoxy resins can be exemplified by a bisphenol A type epoxy resin, a bisphenol F type epoxy resin, a bisphenol AD type epoxy resin, and an epoxy resin having structures of both bisphenol A and bisphenol F.

The novolac type epoxy resins can be exemplified by a phenol novolac type epoxy resin and a cresol novolac type epoxy resin.

The polyglycidyl ethers of aliphatic polyhydric alcohols can be exemplified by alkylene glycol diglycidyl ether (such as ethylene glycol diglycidyl ether), polyoxyalkylene glycol diglycidyl ether (such as diethylene glycol diglycidyl ether, polyethylene glycol diglycidyl ether, dipropylene glycol diglycidyl ether, tripropylene glycol diglycidyl ether, and polypropylene glycol diglycidyl ether), and glycerine triglycidyl ether.

Either a single kind or a combination of plural kinds of these glycidyl ether type epoxy resins may be used.

[Chemical Formula 1]

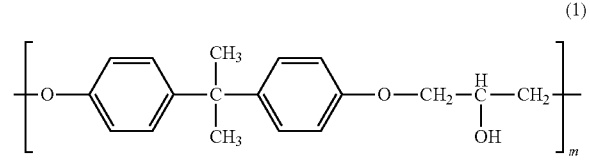

(1)

Here, the symbol m represents an integer of 1 or greater.

Preferred glycidyl ether unit-containing polymers (E) are a bisphenol A type epoxy resin, a bisphenol F type epoxy resin, an epoxy resin having structures of both bisphenol A and bisphenol F, a phenol novolac type epoxy resin, a cresol novolac type epoxy resin, and an epoxy group-containing phenoxy resin. Using such a preferred polymer, the impact resistance and the surface impact strength determined by a falling ball test will be improved.

The glycidyl ether unit-containing polymer (E) may be in any state among a liquid state, a semisolid state, and a solid state, at normal temperature (20° C.), although the solid state is preferred considering the operability for the extrusion process.

The mass average molecular weight of the glycidyl ether unit-containing polymer (E) is from 3,000 to 200,000, preferably from 4,000 to 60,000, and more preferably from 5,000 to 55,000. If the mass average molecular weight of the glycidyl ether unit-containing polymer (E) is 3,000 or higher, the falling ball impact strength will be improved. If the mass average molecular weight of the glycidyl ether unit-containing polymer (E) is 200,000 or lower, the moldability will be improved.

The glycidyl ether unit-containing polymer (E) is commercially available. Examples of such a commercial product can include "jER" series manufactured by Japan Epoxy Resins Co., Ltd., "Epototo" series and "Phenototo" series manufactured by Tohto Kasei Co., Ltd., "AER" series manufactured by Asahi Kasei Chemicals Corporation, and "Epiclon" series manufactured by Dainippon Ink and Chemicals, Incorporated.

The content of the glycidyl ether unit-containing polymer (E) is from 0.5 to 20 parts by mass, preferably from 1 to 12 parts by mass, and more preferably from 3 to 9 parts by mass, relative to 100 parts by mass of the resin main component (C). If the content of the glycidyl ether unit-containing polymer (E) is 0.5 parts by mass or higher, the mechanical strengths and the falling ball impact strength will be improved. If the content of the glycidyl ether unit-containing polymer (E) is 20 parts by mass or lower, the moldability will be improved.

(Other Components)

The reinforced thermoplastic resin composition can also appropriately include another modifier, a mold releasing agent, a light or thermal stabilizer, an antistatic agent, a dye, a pigment, or the like, if necessary.

(Production Method)

The reinforced thermoplastic resin composition is produced by mixing the graft copolymer (A), the matrix polymer (B), the inorganic filler (D), and the glycidyl ether unit-containing polymer (E) mentioned above. The mixture may also be additionally kneaded by a kneading device (such as a single screw extruder, a twin screw extruder, a banbury mixer, and a ko-kneader).

Flame-Retardant Type Reinforced Thermoplastic Resin Composition

A flame-retardant type reinforced thermoplastic resin composition serving as a second embodiment example of the present invention includes a graft copolymer (A), a matrix polymer (B), an inorganic filler (D), a glycidyl ether unit-containing polymer (E), and a phosphate ester-based flame-retardant agent (F).

The graft copolymer (A), the matrix polymer (B), the inorganic filler (D), and the glycidyl ether unit-containing polymer (E) in this embodiment example have the same meanings as those of the graft copolymer (A), the matrix polymer (B), the inorganic filler (D), and the glycidyl ether unit-containing polymer (E) in the first embodiment example mentioned above.

(Phosphate Ester-Based Flame-Retardant Agent (F))

The phosphate ester-based flame-retardant agent is a compound represented by the following formula (2).

[Chemical Formula 2]

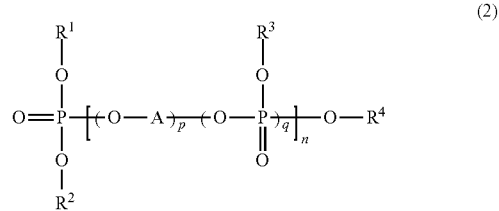

(2)

Here, $R^1$, $R^2$, $R^3$, and $R^4$ represent, each independently, a hydrogen atom or an organic group, provided that not all the $R^1$, $R^2$, $R^3$, and $R^4$ are hydrogen atoms.

The symbol A represents a divalent or higher organic group, the symbol p represents 0 or 1, the symbol q represents an integer of 1 or greater, and the symbol n represents an integer of 0 or greater.

Examples of the organic group can include substitutable alkyl groups (such as a methyl group, an ethyl group, a butyl group, and an octyl group), cycloalkyl groups (such as a cyclohexyl group), and aryl groups (such as a phenyl group and alkyl group-substituted phenyl groups). In addition, the number of substituent groups, if any, is not limited. The substituted organic group can be exemplified by an alkoxy group, an alkylthio group, an aryloxy group, and an arylthio group. Moreover, the organic group may be a group in which these substituent groups are combined with each other (such as an arylalkocykylalkyl group) or a group in which these substituent groups are combined by bonding through an oxygen atom, a nitrogen atom, a sulfur atom, or the like (such as an arylsulfonyl aryl group).

In addition, the term "divalent or higher organic group" refers to a divalent or higher functional group obtained by removing two or more hydrogen atoms binding to carbon atom(s) in the above-mentioned organic group. Examples thereof can include an alkylene group and a (substituted) phenylene group. The hydrogen atoms to be removed from the carbon atom(s) can be selected at discretion.

Specific examples of the phosphate ester-based flame-retardant agent (F) can include trimethyl phosphate, triethyl phosphate, tributyl phosphate, trioctyl phosphate, tributoxyethyl phosphate, triphenyl phosphate, tricresyl phosphate, trixyl phosphate, cresyl diphenyl phosphate, xyl diphenyl phosphate, octyl diphenyl phosphate, diphenyl-2-ethylcresyl phosphate, tris(isopropylphenyl) phosphate, and resorcinyl diphenyl phosphate.

In addition, polyphosphates such as bisphenol A-bis(dicresyl phosphate), phenylene bis(diphenyl phosphate), phenylene bis(ditolyl phosphate), and phenylene bis(dixylyl phosphate), which are exemplified by bisphenol A bisphosphates, hydroquinone bisphosphates, resorcin bisphosphates, trioxybenzene triphosphates, can also be included.

Either a single kind or a combination of plural kinds of these phosphate ester-based flame-retardant agents (F) may be used.

Of the above specific examples, preferred examples of the phosphate ester-based flame-retardant agent (F) are trixyl phosphate, phenylene bis(diphenyl phosphate), phenylene bis(dixylyl phosphate), phenylene bis(ditolyl phosphate), and bisphenol A-bis(dicresyl phosphate), and more preferred are phenylene bis(diphenyl phosphate) and phenylene bis(dixylyl phosphate).

The polyphosphate of the phosphate ester-based flame-retardant agent (F) can be obtained by, for example, dehydration-condensation between an orthophosphoric acid and a diol of any various kinds such as polynuclear phenols (for example, bisphenol A). Examples of such a diol can include hydroquinone, resorcinol, diphenylolmethane, diphenyloldimethylmethane, dihydroxybiphenyl, p,p'-dihydroxy diphenyl sulfone, dihydroxynaphthalene, or the like.

The molecular weight of the phosphate ester-based flame-retardant agent (F) is higher than 326, and preferably 550 or higher. With the phosphate ester-based flame-retardant agent having a molecular weight of higher than 326, the moldability will be improved, the gas emission during the molding process will be reduced, and a molded article having excellent appearance can be obtained.

In addition, the upper limit of the molecular weight of the phosphate ester-based flame-retardant agent is preferably lower than 692, and more preferably 686 or lower, in terms of the flame retardancy of the resultant reinforced resin composition.

The phosphate ester-based flame-retardant agent (F) is commercially available. Examples of such a commercial product can include "FP" series manufactured by ADEKA Corporation, "Kronitex" series manufactured by Ajinomoto Fine-Techno Co., Inc., "Reofos" series manufactured by Chemtura Japan Limited, "CR" series and "PX" series manufactured by Daihachi Chemical Industry Co. Ltd.

The content of the phosphate ester-based flame-retardant agent (F) is from 0.1 to 40 parts by mass, and preferably from 0.1 to 35 parts by mass, relative to 100 parts by mass of the resin main component (C). If the content of the phosphate ester-based flame-retardant agent (F) is 0.1 part by mass or higher, flame retardancy will be given. If the content of the phosphate ester-based flame-retardant agent (F) is 40 parts by mass or lower, thermal resistance and impact resistance will be given.

The flame-retardant type reinforced resin composition may also contain a known non-halogen flame-retardant agent, in addition to the phosphate ester-based flame-retardant agent (F) so that the both agents can be used in combination. Examples of the non-halogen flame-retardant agent can include inorganic flame-retardant agents such as red phosphorus and aluminum hydroxide.

The red phosphorus-based flame-retardant agent can be used after stabilization by coating with a thermosetting resin either with or without metal hydroxide. Since the red phosphorus-based flame-retardant agent is flammable by its own, it may be mixed with the matrix polymer (B) or at least a part of the resin main component (C) in a form of a master batch.

(Flame-Retardant Auxiliary Agent)

The flame-retardant type reinforced thermoplastic resin composition may also contain a flame-retardant auxiliary agent for preventing dripping resulting from burning. Examples of the flame-retardant auxiliary agent can include polytetrafluoroethylene, tetrafluoroethylene-containing compounds, and silicone-based polymers.

If polytetrafluoroethylene or a tetrafluoroethylene-containing compound is contained as the flame-retardant auxiliary agent, the content thereof is preferably 0.5 parts by mass or lower, relative to 100 parts by mass of the resin main component (C), from the point of the surface appearance.

(Composition)

In the flame-retardant type reinforced thermoplastic resin composition, the content of the graft copolymer (A) in the resin main component (C) is from 10 to 40% by mass, and preferably from 10 to 30% by mass (provided that the total amount of the component (A) and the component (B) accounts for 100% by mass). If the content of the graft copolymer (A) is 10% by mass or higher, the impact resistance of the reinforced thermoplastic resin composition will be improved. If the content of the graft copolymer (A) is 40% by mass or lower, the molding processability of the reinforced thermoplastic resin composition will be improved.

The contents of the inorganic filler (D) and the glycidyl ether unit-containing 2 0 polymer (E) are the same as those of the first embodiment example.

(Operation and Effect)

The reinforced thermoplastic resin composition including the glycidyl ether unit-containing polymer (E) has excellent moldability and mechanical strengths such as the bending strength, as well as being capable of improving the drop impact resistance (falling ball impact strength). In addition, molded articles formed from a resin including this reinforced thermoplastic resin composition have excellent secondary processability.

Molded Article

The molded article of the present invention is formed through molding processing of the above-mentioned reinforced thermoplastic resin composition.

The molding processing method of the reinforced thermoplastic resin composition can be exemplified by injection molding, injection compression molding, extrusion, blow molding, vacuum molding, air-pressure molding, calendar molding, inflation molding, or the like. Of these, injection molding and injection compression molding are preferred as they excel in the mass productivity and enable to yield molded articles of highly precise dimensions.

The molded article of the present invention can be applied to, for example: housings of a personal computer (including a laptop type), a projector (including a liquid crystal projector), a television set, a printer, a fax machine, a copying machine, audio equipment, a game machine, a camera (including a video camera, a digital camera, and the like), filming equipment such as video equipment, musical instruments, a portable device (such as an electronic diary and a personal digital assistant (PDA)), lighting equipment, and a communication device such as a telephone (including a mobile phone); fishing goods; play equipment such as pinball goods; products for vehicles; products for furniture; products for sanitation; and products for building materials. Of these applications, suitable application is a housing of an electronic part of a laptop personal computer, a portable device, or the like because the effects of the present invention can be especially exploited.

EXAMPLES

Hereunder, specific examples are shown. The present invention is not to be limited to these examples. In addition, the following denotations of "part" and "%" respectively refer to "part by mass" and "% by mass".

[Preparation of Graft Copolymer (A-1)]

To 100 parts (in terms of solid content) of a polybutadiene latex having an average particle diameter of 0.08 μm at a solid content concentration of 35% was added 2 parts (in terms of solid content) of a copolymer latex having an average particle diameter of 0.08 μm consisting of 85% of an n-butyl acrylate unit and 15% of a methacrylic acid unit, under stirring. Next, the mixture was kept stirred for 30 minutes, thereby yielding an enlarged butadiene-based rubber polymer latex having an average particle diameter of 0.28 μm.

The yielded enlarged butadiene-based rubber polymer latex was placed in a reactor vessel, to which 100 parts of distilled water, 4 parts of a wood rosin emulsifier, 0.4 parts of Demol N (product name of naphthalene sulfonate formaldehyde condensate manufactured by Kao Chemicals), 0.04 parts of sodium hydroxide, and 0.7 parts of dextrose were further added. Next, the mixture was heated under stirring. When the internal temperature reached 60° C., 0.1 part of ferrous sulfate, 0.4 parts of sodium pyrophosphate, and 0.06 parts of sodium dithionite were added. Then, a mixture containing the following components was continuously added dropwise over 90 minutes. The resultant product was allowed to stand for 1 hour and then was cooled down.

| Acrylonitrile | 30 parts |
|---|---|
| Styrene | 70 parts |
| Cumene hydroperoxide | 0.4 parts |
| tert-dodecyl mercaptan | 1 part |

The thus yielded graft copolymer latex was coagulated with dilute sulfuric acid. The coagulated product was then washed, filtrated, and dried, thereby yielding a dried powder of the graft copolymer (A-1).

The content of an acetone-soluble matter in this graft copolymer (A-1) was 27%. Moreover, the reduced viscosity was 0.30 dl/g.

The measurement method of the acetone-soluble matter is as follows. 2.5 g of the graft copolymer is dipped in 90 ml of acetone, heated at 65° C. for 3 hours, and then centrifuged at 1500 rpm for 30 minutes by using a centrifugal separator. Thereafter, the supernatant liquid is discarded. The residue is dried at 65° C. for 12 hours by a vacuum drier, and the dried sample is precisely weighed. From the mass difference between before and after this process ([graft copolymer 2.5g]−[mass weight of the dried sample]), the content rate (%) of the acetone-soluble matter relative to the graft copolymer can be determined.

The reduced viscosity was measured in a 0.2 g/dl N,N-dimethylformamide solution at 25° C.

[Preparation of Graft Copolymer (A-2)]

Raw materials at the following proportions were charged in a reactor vessel and polymerized under stirring with nitrogen replacement at 50° C. for 4 hours, thereby yielding a rubber latex.

| N-butyl acrylate | 98 parts |
|---|---|
| 1,3-butylene glycol dimethacrylate | 1 part |
| Allyl methacrylate | 1 part |
| Sodium dioctylsulfosuccinate | 2.0 parts |
| Deionized water | 300 parts |
| Potassium persulfate | 0.3 parts |
| Disodium phosphate dodecahydrate | 0.5 parts |
| Sodium hydrogen phosphate dodecahydrate | 0.3 parts |

100 parts (in terms of solid content) of the thus yielded rubber latex was charged in another reactor vessel, and diluted with 280 parts of ion exchange water. The diluted product was heated to 70° C.

Separately, 0.7 parts of benzoyl peroxide was dissolved in 100 parts of a monomer mixture consisting of acrylonitrile/styrene=29/71 (mass ratio), and the mixture was subjected to nitrogen replacement. Then, this monomer mixture was added at a rate of 30 parts/hour by a metering pump into the reactor vessel which contained the above-mentioned rubber latex. After all the monomers were added, the temperature inside the reactor vessel was raised to 80° C., and the mixture was kept stirred for 30 minutes, thereby yielding a graft copolymer latex. The polymerization rate was 99%.

This graft copolymer latex was charged into a coagulation bath which contained an aqueous solution of 0.15% aluminum chloride ($AlCl_3.6H_2O$) (90° C.) at a three times greater amount than the total amount of the latex, under stirring to effect coagulation. After all the latex was added, the temperature inside the coagulation bath was raised to 93° C., and the mixture was allowed to stand for 5 minutes. This was cooled down and then drained by a centrifugal separator. The drained product was washed and dried, thereby yielding a dried powder of the graft copolymer (A-2).

The content of an acetone-soluble matter in this graft copolymer (A-2) was 21%. Moreover, the reduced viscosity was 0.70 dl/g.

[Preparation of Graft Copolymer (A-3)]

The graft copolymer (A-3) including a composite rubber of polybutadiene/polybutyl acrylate as a rubber polymer was synthesized in the following manner.

To 20 parts (in terms of solid content) of a polybutadiene latex having an average particle diameter of 0.08 μm at a solid content concentration of 35% was added 0.4 parts of (in terms of solid content) a copolymer latex having an average particle diameter of 0.10 μm consisting of 82% of an n-butyl acrylate unit and 18% of a methacrylic acid unit, under stirring. Next, the mixture was kept stirred for 30 minutes, thereby yielding an enlarged diene-based rubber latex having an average particle diameter of 0.36 μm.

20 parts (in terms of solid content) of the yielded enlarged diene-based rubber latex was placed in a reactor vessel, to which 1 part of disproportionated rosin potassium, 150 parts of ion exchange water, and a monomer mixture having the following composition were added. The product was subjected to nitrogen replacement and then heated to 50° C. (internal temperature). Furthermore, a solution having 0.0002 parts of ferrous sulfate, 0.0006 parts of disodium ethylenediaminetetraacetate, and 0.25 parts of rongalit dissolved in 10 parts of ion exchange water was added into the reactor vessel, to effect a reaction.

| N-butyl acrylate | 80 parts |
| Allyl methacrylate | 0.32 parts |
| Ethylene glycol dimethacrylate | 0.16 parts |

The internal temperature at the completion of the reaction was 75° C. The solution was further heated up to 80° C., and the reaction was kept continued for 1 hour, thereby yielding a composite rubber of the enlarged diene-based rubber and the polyalkyl acrylate-based rubber. The polymerization rate was 98.8%.

Next, 50 parts (in terms of solid content) of the composite rubber latex of the enlarged diene-based rubber and the polyalkyl acrylate-based rubber was placed in a reactor vessel, which was then diluted with 140 parts of ion exchange water. The diluted solution was heated to 70° C.

Separately, 0.35 parts of benzoyl peroxide was dissolved in 50 parts of a monomer mixture consisting of acrylonitrile/styrene=29/71 (mass ratio), and the mixture was subjected to nitrogen replacement. This monomer mixture was added at a rate of 15 parts/hour by a metering pump into the reactor vessel which contained the above-mentioned rubber latex. After all the monomers were added, the temperature inside the reactor vessel was raised to 80° C., and the mixture was kept stirred for 30 minutes, thereby yielding a graft copolymer latex. The polymerization rate was 99%.

This graft copolymer latex was charged into a coagulation bath which contained 0.5% sulfuric acid solution (90° C.) at a three times greater amount than the total amount of the latex, under stirring to effect coagulation. After all the latex was added, the temperature inside the coagulation bath was raised to 93° C., and the mixture was allowed to stand for 5 minutes. This was cooled down and then drained by a centrifugal separator. The drained product was washed and dried, thereby yielding a dried powder of the graft copolymer (A-3).

The content of an acetone-soluble matter in this graft copolymer (A-3) was 20%. Moreover, the reduced viscosity was 0.66 dl/g.

[Preparation of Graft Copolymer (A-4)]

The graft copolymer (A-4) including a composite rubber of polysiloxane rubber/polybutyl acrylate as a rubber polymer was synthesized in the following manner.

96 parts of octamethyltetracyclosiloxane, 2 parts of γ-methacryloxypropyldimethoxymethylsilane, and 2 parts of ethyl orthosilicate were mixed to yield 100 parts of a siloxane-based mixture. This mixture was added with 300 parts of distilled water having 0.67 parts of sodium dodecylbenzene sulfonate dissolved therein. The mixture was stirred by a homomixer at 10000 revolutions/2 minutes, and then was homogenized under a pressure of 30 MPa once by a homogenizer, thereby yielding a stabilized premix organosiloxane latex.

In addition, 2 parts of dodecylbenzenesulfonic acid and 98 parts of distilled water were charged in a reactor vessel equipped with a reagent infusion container, a cooling tube, a jacket heater, and a stirring device, by which an aqueous solution of 2% dodecylbenzenesulfonic acid was prepared. This aqueous solution was heated to 85° C. In this state, the premix organosiloxane latex was added dropwise thereto over 4 hours. After the dropwise addition, the solution was kept at this temperature for 1 hour, and then was cooled down. The reaction solution was allowed to stand at room temperature for 48 hours, and then neutralized with an aqueous solution of sodium hydroxide, thereby yielding a polyorganosiloxane latex (L-1). A portion of the polyorganosiloxane latex (L-1) was dried at 170° C. for 30 minutes to obtain the solid content concentration. The thus obtained solid content concentration was 17.3%.

Next, 119.5 parts of the polyorganosiloxane latex (L-1) and 0.8 parts of sodium polyoxyethylene alkyl phenyl ether sulfate were charged in a reactor vessel equipped with a reagent infusion container, a cooling tube, a jacket heater, and a stirring device. Subsequently, 203 parts of distilled water was added and mixed therein. Then, a mixture consisting of 53.2 parts of n-butyl acrylate, 0.21 parts of allyl methacrylate, 0.11 parts of 1,3-butylene glycol dimethacrylate, and 0.13 parts of tertiary butyl hydroperoxide was added thereto. A nitrogen gas was let to flow through this reactor vessel so as to replace the inside atmosphere with nitrogen, and the temperature was raised to 60° C. When the internal temperature of the reactor vessel reached 60° C., an aqueous solution having 0.0001 part of ferrous sulfate, 0.0003 parts of disodium ethylenediaminetetraacetate, and 0.24 parts of rongalit dissolved in 10 parts of distilled water was added to initiate radical polymerization. Due to the polymerization of the acrylate components, the temperature of the solution increased to 78° C. This state was kept for 1 hour to complete the polymerization of the acrylate components, thereby yielding a composite rubber latex of polyorganosiloxane and a butyl acrylate rubber.

After the solution temperature inside the reactor vessel decreased to 60° C., an aqueous solution having 0.4 parts of rongalit dissolved in 10 parts of distilled water was added. Next, a mixed solution including 11.1 parts of acrylonitrile, 33.2 parts of styrene, and 0.2 parts of tertiary butyl hydroperoxide was added dropwise over about 1 hour to effect polymerization. After the dropwise addition, the solution was allowed to stand for 1 hour, and then was added with an aqueous solution having 0.0002 parts of ferrous sulfate, 0.0006 parts of disodium ethylenediaminetetraacetate, and 0.25 parts of rongalit dissolved in 10 parts of distilled water. Next, a mixed solution including 7.4 parts of acrylonitrile, 22.2 parts of styrene, and 0.1 part of tertiary butyl hydroperoxide was added dropwise over about 40 minutes to effect polymerization. After the dropwise addition, the solution was allowed to stand for 1 hour, and then was cooled down, thereby yielding a graft copolymer latex in which an acrylonitrile-styrene copolymer was grafted to the composite rubber consisting of polyorganosiloxane and the butyl acrylate rubber.

Next, 150 parts of a 5% calcium acetate aqueous solution was heated to 60° C. and stirred. Into this calcium acetate aqueous solution, 100 parts of the graft copolymer latex was gradually added dropwise to effect coagulation. The coagulated product was taken out, washed, and then dried, thereby yielding a dried powder of the graft copolymer (A-4).

The content of an acetone-soluble matter in this graft copolymer (A-4) was 26%. Moreover, the reduced viscosity was 0.60 dl/g.

[Vinyl-based Copolymer (B-1)]

A copolymer having a composition of 29% of an acrylonitrile unit and 71% of a styrene unit was prepared by suspension polymerization. The reduced viscosity (ηsp/C) of this copolymer at 25° C. was 0.62 g/dl (measured in a 0.2% dimethylformamide solution).

[Polycarbonate resin (B-2)]

The "Novarex 7021PJ" manufactured by Mitsubishi Engineering-Plastics Corporation was used as the polycarbonate resin (B-2).

[Polybutylene Terephthalate Resin (B-3)]

The "TAFPET PBT N1500" manufactured by Mitsubishi Rayon Co., Ltd. was used as the polybutylene terephthalate resin (B-3).

[Carbon Fiber (D)]

The "Besfight HTA-C6-SRS" (epoxy size) manufactured by Toho Rayon Co. Ltd. was used as the carbon fiber (D-1).

The "Besfight HTA-C6-U" (urethane size) manufactured by Toho Rayon Co. Ltd. was used as the carbon fiber (D-2).

[Glycidyl Ether Unit-Containing Polymer (E)]

The "4250" (mass average molecular weight; 60,000) manufactured by Japan Epoxy Resins Co., Ltd. was used as the glycidyl ether unit-containing polymer (E-1).

The "1256" (mass average molecular weight; 50,000) manufactured by Japan Epoxy Resins Co., Ltd. was used as the glycidyl ether unit-containing polymer (E-2).

The "1010" (mass average molecular weight; 5,500) manufactured by Japan Epoxy Resins Co., Ltd. was used as the glycidyl ether unit-containing polymer (E-3).

The "1009" (mass average molecular weight; 3,800) manufactured by Japan Epoxy Resins Co., Ltd. was used as the glycidyl ether unit-containing polymer (E-4).

The "1004" (mass average molecular weight; 1,650) manufactured by Japan Epoxy Resins Co., Ltd. was used as the glycidyl ether unit-containing polymer (E-5).

[Phosphate Ester-based Flame-Retardant Agent (F)]

The "PX-200" (molecular weight 686) manufactured by Daihachi Chemical Industry Co. Ltd. was used as the phosphate ester-based flame-retardant agent (F-1).

The "CR-733S" (molecular weight 574) manufactured by Daihachi Chemical Industry Co. Ltd. was used as the phosphate ester-based flame-retardant agent (F-2).

The "TPP" (molecular weight 326) manufactured by Daihachi Chemical Industry Co. Ltd. was used as the phosphate ester-based flame-retardant agent (F-3).

The "BAPP" (molecular weight 692) manufactured by Ajinomoto Fine-Techno Co., Inc. was used as the phosphate ester-based flame-retardant agent (F-4).

In addition, in examples in which the flame retardancy was given by the phosphate ester-based flame-retardant agent (F), polytetrafluoroethylene (PTFE) was added as the flame-retardant auxiliary agent.

Moreover, in the comparative example 16 shown below, a carboxyl group-containing olefin-based wax ("Diacarna 30" manufactured by Mitsubishi Chemical Corporation) was used instead of the glycidyl ether unit-containing polymer (E).

The graft copolymers (A-1) to (A-4), the matrix polymers (B-1) to (B-3), the carbon fibers (D-1) and (D-2), the glycidyl ether unit-containing polymers (E-1) to (E-5), and the phosphate ester-based flame-retardant agents (F-1) to (F-4) were mixed shown in Tables 1 to 6, to obtain reinforced thermoplastic resin compositions.

The obtained reinforced thermoplastic resin compositions were evaluated for the falling ball impact strength, the Charpy impact strength, the flame retardancy, the moldability, and the surface appearance in the following manners. These evaluation results are shown in Tables 1 to 6.

[Falling Ball Impact Strength]

Test specimens (100 mm×100 mm×1 mm in thickness) made by injection molding were used to perform the falling ball impact test. In the test, the tester of the UL1956 vertical falling ball test method was used to examine the critical fracture height when using a 500 g steel ball.

[Charpy Impact Strength]

The Charpy impact strength was measured in accordance with ISO 179.

[Bending Strength and Bend Elastic Constant]

The bending strength and the bend elastic constant were measured in accordance with ISO 178. The bending strength and the bend elastic constant serve as indexes to indicate the mechanical strengths of a material.

[Flame Retardancy]

Test specimens (width 12.7 mm, length 127 mm, thickness 1.0 mm) were made by molding the reinforced thermoplastic resin, and subjected to a burning test in accordance with UL94. To evaluate the flame retardancy, the examples 1 to 23 and the comparative examples 1 to 16 including the phosphate ester-based flame-retardant agent (F) were subjected to the vertical burning test, and the examples 24 to 38 and the comparative examples 17 to 21 not including the phosphate ester-based flame-retardant agent (F) were subjected to the horizontal burning test.

(1) Vertical Burning Test

The test specimens were vertically supported. A burner flame was applied to the lower edges of these specimens for 10 seconds and then removed. After burning ceased, the burner flame was reapplied and the same procedure was done. The evaluation was made based on the flaming combustion time after the removal of the first flame, the total of the second flaming combustion time and the flameless combustion time, and the presence or absence of drips after burning. The summary of the criteria of respective grades of UL94 are as follows.

V-0: The first flaming combustion time may not exceed 10 seconds. The total of the second flaming combustion time and the flameless combustion time may not exceed 30 seconds. Drips after burning are not allowed.

V-1: The first flaming combustion time may exceed 10 seconds but may not exceed 30 seconds. The total of the second flaming combustion time and the flameless combustion time may exceed 30 seconds but may not exceed 60 seconds. Drips after burning are not allowed.

V-2: The first flaming combustion time may exceed 10 seconds but may not exceed 30 seconds. The total of the second flaming combustion time and the flameless combustion time may exceed 30 seconds but may not exceed 60 seconds. Drips after burning are allowed.

The flame retardancy is expressed by the following scales in the column of the flame retardancy of the examples 1 to 23 and the comparative examples 1 to 16 in Tables 1, 2, 4, and 5.

⊚: The flame retardancy was in the V-0 level.

○: The flame retardancy was in the V-1 level.

Δ: The flame retardancy was in the V-2 level.

×: The flame retardancy was below the V-2 level.

(2) Horizontal Burning Test

The test specimens were horizontally supported. A burner flame was applied to the edges of these specimens for 30 seconds and then removed. After the removal of the flame, the time for the flame to travel between two gauge marks (75 mm) which were previously marked on the test specimens was measured. The thus calculated burning rate was used for the evaluation. The summary of the criteria of UL94 are as follows. HB; Burning ceases after the removal of the flame, and the burn rate may not exceed 75 mm/min.

The flame retardancy is expressed by the following scales in the column of the flame retardancy of the examples 24 to 38 and the comparative examples 17 to 21 in Tables 3 and 6.

○: The flame retardancy was in the HB level.

×: The flame retardancy was below the HB level.

[Moldability]

A liquid crystal display cover (1.2 mm in thickness) for A4 sized laptop personal computer was formed by an injection molding machine (J350E with a 350t accumulator manufactured by The Japan Steel Works, LTD.) in the following molding condition. The moldability was evaluated based on the occurrence of short shot (failure of filling) and the occurrence of corrosion by gas after molding.

○: No failure of filling was found.

Δ: Failure of filling was partially found.

×: Either one or both of failure of filling and corrosion by gas was found.

(Molding Condition)

The molding condition for the flame-retardant type reinforced thermoplastic resin compositions was set such that the molding temperature was 260° C., the molding rate was 99%, and the mold temperature was 80° C.

The molding condition for the non-flame-retardant type reinforced thermoplastic resin compositions was set such that the molding temperature was 290° C., the molding rate was 99%, and the mold temperature was 80° C.

[Surface Appearance Test]

A liquid crystal display cover (1.2 mm in thickness) for an A4 sized laptop personal computer was formed by the injection molding machine (J350E with a 350t accumulator manufactured by The Japan Steel Works, LTD.) in the following molding condition. The obtained molded article was evaluated for the surface appearance by eye.

○: Glossy finish by eye (without protruding carbon fibers).

×: Non glossy finish by eye (with protruding carbon fibers).

(Molding Condition)

The molding condition for the flame-retardant type reinforced thermoplastic resin compositions was set such that the molding temperature was 260° C., the molding rate was 99%, and the mold temperature was 80° C.

The molding condition for the non-flame-retardant type reinforced thermoplastic resin compositions was set such that the molding temperature was 290° C., the molding rate was 99%, and the mold temperature was 80° C.

TABLE 1

| | | | Example No. | | | | | | |
|---|---|---|---|---|---|---|---|---|---|
| | | | 1 | 2 | 3 | 4 | 5 | 6 | 7 |
| C | A-1 | % | 10 | | | | | | |
| | A-2 | % | | 10 | | | | | |
| | A-3 | % | | | 10 | | | | |
| | A-4 | % | | | | 10 | 10 | 10 | 10 |
| | B-1 | % | | | | | | | |
| | B-2 | % | 90 | 90 | 90 | 90 | 90 | 90 | 90 |
| | B-3 | % | | | | | | | |
| D-1 | | parts | 15 | 15 | 15 | 15 | 5 | 30 | 50 |
| D-2 | | parts | | | | | | | |
| E-1 | | parts | | | | | | | |
| E-2 | | parts | 9 | 9 | 9 | 9 | 9 | 9 | 9 |
| E-3 | | parts | | | | | | | |
| F-1 | | parts | 20 | 20 | 20 | 20 | 20 | 35 | 40 |
| F-2 | | parts | | | | | | | |
| F-3 | | parts | | | | | | | |
| F-4 | | parts | | | | | | | |
| PTFE | | parts | 0.5 | 0.5 | 0.5 | 0.5 | 0.5 | 0.5 | 0.5 |
| Falling ball impact strength | | (cm) | 140 | 150 | 150 | 150 | 170 | 100 | 80 |
| Charpy impact strength | | (KJ/m²) | 5 | 5 | 5 | 5 | 5 | 5 | 4 |
| Bending strength | | (MPa) | 170 | 175 | 180 | 178 | 120 | 180 | 195 |
| Bend elastic constant | | (MPa) | 8900 | 8800 | 8800 | 8900 | 5000 | 13000 | 16000 |
| Flame retardancy | | — | ◎ | ◎ | ◎ | ◎ | ◎ | ◎ | ○ |
| Moldability | | — | ○ | ○ | ○ | ○ | ○ | ○ | ○ |
| Surface appearance | | — | ○ | ○ | ○ | ○ | ○ | ○ | ○ |

| | | | Example No. | | | | | | |
|---|---|---|---|---|---|---|---|---|---|
| | | | 8 | 9 | 10 | 11 | 12 | 13 | 14 |
| C | A-1 | % | | | | | | | |
| | A-2 | % | | | | | | | |
| | A-3 | % | | | | | | | |
| | A-4 | % | 20 | 10 | 10 | 10 | 10 | 10 | 10 |
| | B-1 | % | | | | | | | 10 |
| | B-2 | % | 80 | 90 | 90 | 90 | 90 | 80 | 80 |
| | B-3 | % | | | | | | 10 | |
| D-1 | | parts | 15 | | 15 | 15 | 15 | 15 | 15 |
| D-2 | | parts | | 15 | | | | | |
| E-1 | | parts | | | | | | | |
| E-2 | | parts | 9 | 9 | 9 | 9 | 9 | 9 | 9 |
| E-3 | | parts | | | | | | | |
| F-1 | | parts | 20 | 20 | | | | 20 | 20 |
| F-2 | | parts | | | 20 | | | | |
| F-3 | | parts | | | | 20 | | | |
| F-4 | | parts | | | | | 20 | | |
| PTFE | | parts | 0.5 | 0.5 | 0.5 | 0.5 | 0.5 | 0.5 | 0.5 |
| Falling ball impact strength | | (cm) | 140 | 150 | 140 | 140 | 130 | 100 | 70 |
| Charpy impact strength | | (KJ/m²) | 5 | 5 | 5 | 5 | 4 | 5 | 5 |
| Bending strength | | (MPa) | 185 | 170 | 175 | 176 | 173 | 176 | 170 |

TABLE 1-continued

| | | | | | | | | |
|---|---|---|---|---|---|---|---|---|
| Bend elastic constant | (MPa) | 8700 | 8600 | 8700 | 8700 | 8700 | 8700 | 8600 |
| Flame retardancy | — | ◎ | ◎ | ◎ | ◎ | ○ | ◎ | ◎ |
| Moldability | — | ○ | ○ | ○ | X | ○ | ○ | ○ |
| Surface appearance | — | ○ | ○ | ○ | ○ | ○ | ○ | ○ |

TABLE 2

| | | | Example No. | | | | | | | | | |
|---|---|---|---|---|---|---|---|---|---|---|---|---|
| | | | 15 | 16 | 16 | 17 | 18 | 19 | 20 | 21 | 22 | 23 |
| C | A-1 | % | | | | | | | | | | |
| | A-2 | % | | | | | | | | | | |
| | A-3 | % | | | | | | | | | | |
| | A-4 | % | 10 | 10 | 10 | 10 | 10 | 10 | 10 | 10 | 10 | 10 |
| | B-1 | % | 5 | | | | | | | | | |
| | B-2 | % | 80 | 90 | 90 | 90 | 90 | 90 | 90 | 90 | 90 | 90 |
| | B-3 | % | 5 | | | | | | | | | |
| D-1 | | parts | 15 | 15 | 15 | 15 | 15 | 15 | 15 | 15 | 15 | 15 |
| D-2 | | parts | | | | | | | | | | |
| E-1 | | parts | | | | | | | | 9 | | |
| E-2 | | parts | 9 | 1 | 3 | 6 | 12 | 20 | | | | 9 |
| E-3 | | parts | | | | | | | | 9 | | |
| E-4 | | parts | | | | | | | | | 9 | |
| E-5 | | parts | | | | | | | | | | |
| F-1 | | parts | 20 | 20 | 20 | 20 | 20 | 20 | 20 | 20 | 20 | 41 |
| F-2 | | parts | | | | | | | | | | |
| F-3 | | parts | | | | | | | | | | |
| F-4 | | parts | | | | | | | | | | |
| PTFE | | parts | 0.5 | 0.5 | 0.5 | 0.5 | 0.5 | 0.5 | 0.5 | 0.5 | 0.5 | 0.5 |
| Falling ball impact strength | (cm) | | 110 | 30 | 60 | 130 | 140 | 130 | 110 | 100 | 80 | 60 |
| Charpy impact strength | (KJ/m$^2$) | | 5 | 5 | 5 | 5 | 5 | 4 | 5 | 5 | 5 | 3 |
| Bending strength | (MPa) | | 187 | 150 | 165 | 195 | 195 | 190 | 188 | 185 | 185 | 175 |
| Bend elastic constant | (MPa) | | 8600 | 8900 | 8800 | 8800 | 8800 | 8900 | 8800 | 8700 | 8700 | 8500 |
| Flame retardancy | — | | ◎ | ◎ | ◎ | ◎ | ◎ | ○ | ◎ | ◎ | ◎ | Δ |
| Moldability | — | | ○ | ○ | ○ | ○ | ○ | Δ | ○ | ○ | ○ | ○ |
| Surface appearance | — | | ○ | ○ | ○ | ○ | ○ | ○ | ○ | ○ | ○ | ○ |

TABLE 3

| | | | Example No. | | | | | | | | | | | | | | |
|---|---|---|---|---|---|---|---|---|---|---|---|---|---|---|---|---|---|
| | | | 24 | 25 | 26 | 27 | 28 | 29 | 30 | 31 | 32 | 33 | 34 | 35 | 36 | 37 | 38 |
| C | A-1 | % | 10 | | | | | | | | | | | | | | |
| | A-2 | % | | | | | | | | | | | | | | | |
| | A-3 | % | | | | | | | | | | | | | | | |
| | A-4 | % | | 10 | 10 | 10 | 10 | 20 | 10 | 60 | 25 | 25 | 25 | 25 | 25 | 25 | 25 |
| | B-1 | % | | | | | | | 10 | | 15 | 10 | 15 | 15 | 15 | 15 | 15 |
| | B-2 | % | 90 | 90 | 90 | 90 | 90 | 80 | 80 | 40 | 60 | 60 | 60 | 60 | 60 | 60 | 60 |
| | B-3 | % | | | | | | | | | | 5 | | | | | |
| D-1 | | parts | 15 | 15 | 5 | 25 | | 15 | 15 | 15 | 15 | 15 | 15 | 15 | 15 | 15 | 15 |
| D-2 | | parts | | | | | 15 | | | | | | | | | | |
| E-1 | | parts | | | | | | | | | | | | | | | 9 |
| E-2 | | parts | 9 | 9 | 9 | 9 | 9 | 9 | 9 | 9 | 9 | 9 | 1 | 3 | 12 | 20 | |
| E-3 | | parts | | | | | | | | | | | | | | | |
| F-1 | | parts | | | | | | | | | | | | | | | |
| F-2 | | parts | | | | | | | | | | | | | | | |
| F-3 | | parts | | | | | | | | | | | | | | | |
| F-4 | | parts | | | | | | | | | | | | | | | |
| PTFE | | parts | | | | | | | | | | | | | | | |
| Falling ball impact strength | (cm) | | 180 | 180 | 200 | 100 | 100 | 110 | 180 | 60 | 60 | 50 | 30 | 40 | 60 | 40 | 50 |
| Charpy impact strength | (KJ/m$^2$) | | 6 | 6 | 6 | 6 | 6 | 6 | 6 | 5 | 6 | 6 | 6 | 6 | 6 | 6 | 6 |
| Bending strength | (MPa) | | 175 | 187 | 120 | 190 | 150 | 185 | 170 | 165 | 175 | 165 | 145 | 170 | 170 | 150 | 170 |
| Bend elastic constant | (MPa) | | 8700 | 8700 | 5000 | 10000 | 8500 | 8600 | 8500 | 8600 | 8500 | 8500 | 8600 | 8600 | 8600 | 8600 | 8600 |
| Flame retardancy | — | | ○ | ○ | ○ | ○ | ○ | ○ | ○ | ○ | ○ | ○ | ○ | ○ | ○ | ○ | ○ |
| Moldability | — | | ○ | ○ | ○ | ○ | ○ | ○ | ○ | ○ | ○ | ○ | ○ | ○ | ○ | ○ | ○ |
| Surface appearance | — | | ○ | ○ | ○ | ○ | ○ | ○ | ○ | ○ | ○ | ○ | ○ | ○ | ○ | ○ | ○ |

TABLE 4

| | | | Comparative Example No. | | | | | | |
|---|---|---|---|---|---|---|---|---|---|
| | | | 1 | 2 | 3 | 4 | 5 | 6 | 7 |
| C | A-1 | % | 10 | | | | | | |
| | A-2 | % | | 10 | | | | | |
| | A-3 | % | | | 10 | | | | |
| | A-4 | % | | | | 10 | 10 | 10 | 20 |
| | B-1 | % | | | | | | | |
| | B-2 | % | 90 | 90 | 90 | 90 | 90 | 90 | 80 |
| | B-3 | % | | | | | | | |
| D-1 | | parts | 15 | 15 | 15 | 15 | 5 | 23 | 15 |
| D-2 | | parts | | | | | | | |
| E-1 | | parts | | | | | | | |
| E-2 | | parts | | | | | | | |
| E-3 | | parts | | | | | | | |
| E-4 | | parts | | | | | | | |
| E-5 | | parts | | | | | | | |
| F-1 | | Parts | 20 | 20 | 20 | 20 | 20 | 20 | 20 |
| F-2 | | parts | | | | | | | |
| F-3 | | parts | | | | | | | |
| F-4 | | parts | | | | | | | |
| PTFE | | parts | 0.5 | 0.5 | 0.5 | 0.5 | 0.5 | 0.5 | 0.5 |
| Falling ball impact strength | | (cm) | <15 | <15 | <15 | <15 | <15 | <15 | <15 |
| Charpy impact strength | | (KJ/m$^2$) | 5 | 5 | 5 | 5 | 5 | 5 | 5 |
| Bending strength | | (MPa) | 139 | 138 | 133 | 135 | 110 | 150 | 140 |
| Bend elastic constant | | (MPa) | 8400 | 8500 | 8500 | 8600 | 5000 | 9000 | 8500 |
| Flame retardancy | | — | ⊚ | ⊚ | ⊚ | ⊚ | ⊚ | ⊚ | ⊚ |
| Moldability | | — | ○ | ○ | ○ | ○ | ○ | ○ | ○ |
| Surface appearance | | — | X | X | X | X | Δ | X | Δ |

| | | | Comparative Example No. | | | | | |
|---|---|---|---|---|---|---|---|---|
| | | | 8 | 9 | 10 | 11 | 12 | 13 |
| C | A-1 | % | | | | | | |
| | A-2 | % | | | | | | |
| | A-3 | % | | | | | | |
| | A-4 | % | 10 | 10 | 10 | 10 | 10 | 10 |
| | B-1 | % | | | | | | 10 |
| | B-2 | % | 90 | 90 | 90 | 90 | 80 | 80 |
| | B-3 | % | | | | | 10 | |
| D-1 | | parts | | 15 | 15 | 15 | 15 | 15 |
| D-2 | | parts | 15 | | | | | |
| E-1 | | parts | | | | | | |
| E-2 | | parts | | | | | | |
| E-3 | | parts | | | | | | |
| E-4 | | parts | | | | | | |
| E-5 | | parts | | | | | | |
| F-1 | | Parts | 20 | | | | 20 | 20 |
| F-2 | | parts | | 20 | | | | |
| F-3 | | parts | | | 20 | | | |
| F-4 | | parts | | | | 20 | | |
| PTFE | | parts | 0.5 | 0.5 | 0.5 | 0.5 | 0.5 | 0.5 |
| Falling ball impact strength | | (cm) | <15 | <15 | <15 | <15 | <15 | <15 |
| Charpy impact strength | | (KJ/m$^2$) | 5 | 5 | 5 | 5 | 5 | 5 |
| Bending strength | | (MPa) | 138 | 140 | 142 | 140 | 139 | 142 |
| Bend elastic constant | | (MPa) | 8600 | 8700 | 8700 | 8700 | 8700 | 8600 |
| Flame retardancy | | — | ⊚ | ⊚ | ⊚ | ⊚ | ⊚ | ⊚ |
| Moldability | | — | ○ | ○ | ○ | ○ | ○ | ○ |
| Surface appearance | | — | X | X | X | X | Δ | Δ |

TABLE 5

| | | | Comparative Example No. | | |
|---|---|---|---|---|---|
| | | | 14 | 15 | 16 |
| C | A-1 | % | | | |
| | A-2 | % | | | |
| | A-3 | % | | | |
| | A-4 | % | 10 | 10 | 10 |
| | B-1 | % | | | |
| | B-2 | % | 90 | 90 | 90 |
| | B-3 | % | | | |
| D-1 | | parts | 15 | 15 | 15 |
| D-2 | | parts | | | |
| E-1 | | parts | | | |
| E-2 | | parts | 21 | | |
| E-3 | | parts | | | |
| E-4 | | parts | | | |
| E-5 | | parts | | | 9 |
| F-1 | | parts | 20 | 20 | 20 |
| F-2 | | parts | | | |
| F-3 | | parts | | | |
| F-4 | | parts | | | |

TABLE 5-continued

|  |  | Comparative Example No. | | |
|---|---|---|---|---|
|  |  | 14 | 15 | 16 |
| PTFE | parts | 0.5 | 0.5 | 0.5 |
| Diacarna 30 | parts |  |  | 0.6 |
| Falling ball impact strength | (cm) | 40 | <15 | 160 |
| Charpy impact strength | (KJ/m$^2$) | 5 | 5 | 6 |
| Bending strength | (MPa) | 100 | 175 | 107 |
| Bend elastic constant | (MPa) | 8900 | 8800 | 8700 |
| Flame retardancy | — | ○ | ◎ | ◎ |
| Moldability | — | X | ○ | ○ |
| Surface appearance | — | ○ | ○ | X |

TABLE 6

|  |  |  | Comparative Example No. | | | | |
|---|---|---|---|---|---|---|---|
|  |  |  | 17 | 18 | 19 | 20 | 21 |
| C | A-1 | % |  |  |  |  |  |
|  | A-2 | % |  |  |  |  |  |
|  | A-3 | % |  |  |  |  |  |
|  | A-4 | % | 60 | 25 | 25 | 25 | 25 |
|  | B-1 | % |  | 15 | 15 | 15 | 10 |
|  | B-2 | % | 40 | 60 | 60 | 60 | 60 |
|  | B-3 | % |  |  |  |  | 5 |
| D-1 |  | parts | 15 | 15 | 15 | 15 | 15 |
| D-2 |  | parts |  |  |  |  |  |
| E-1 |  | parts |  |  |  |  |  |
| E-2 |  | parts |  |  | 21 |  |  |
| E-3 |  | parts |  |  |  |  |  |
| E-4 |  | parts |  |  |  |  |  |
| E-5 |  | parts |  |  |  | 9 |  |
| F-1 |  | parts |  |  |  |  |  |
| F-2 |  | parts |  |  |  |  |  |
| F-3 |  | parts |  |  |  |  |  |
| F-4 |  | parts |  |  |  |  |  |
| PTFE |  | parts |  |  |  |  |  |
| Falling ball impact strength | | (cm) | <15 | <15 | <15 | <15 | <15 |
| Charpy impact strength |  | (KJ/m$^2$) | 5 | 6 | 6 | 6 | 6 |
| Bending strength |  | (MPa) | 135 | 140 | 185 | 170 | 139 |
| Bend elastic constant |  | (MPa) | 8600 | 8600 | 8600 | 8600 | 8500 |
| Flame retardancy |  | — | ○ | ○ | ○ | ○ | ○ |
| Moldability |  | — | ○ | ○ | X | ○ | ○ |
| Surface appearance |  | — | X | X | ○ | ○ | X |

As apparent from Tables 1 to 3, the carbon fiber-reinforced thermoplastic resin compositions of the examples 1 to 38 including the graft copolymer (A), the matrix polymer (B), the inorganic filler (D), and the glycidyl ether unit-containing polymer (E), no matter whether the compositions were the flame-retardant type or the non-flame-retardant type, excelled in the Charpy impact strength, the bending strength, and the falling ball impact strength. In addition, a falling ball impact strength of no more than 40 to 60 cm is an enough practical range for flame-retardant type reinforced thermoplastic resin compositions.

In addition, the carbon fiber-reinforced thermoplastic resin compositions of the examples 1 to 11 and 13 to 38, in which the molecular weight of the flame-retardant agent (F) was lower than 692, showed high combustibility. In particular, the comparison between the example 4 and the example 12 ensured that a molecular weight of the flame-retardant agent (F) being lower than 692 can contribute to excellent flame retardancy.

On the other hand, as apparent from Tables 4 to 6, the carbon fiber-reinforced thermoplastic resin compositions of the comparative examples 1 to 13, 16 to 18, and 21 including the graft copolymer (A), the matrix polymer (B), and the inorganic filler (D), but not including the glycidyl ether unit-containing polymer (E) had low falling ball impact strength.

The carbon fiber-reinforced thermoplastic resin compositions of the comparative examples 14 and 19 including the graft copolymer (A), the matrix polymer (B), the inorganic filler (D), and the glycidyl ether unit-containing polymer (E), in which the content of the glycidyl ether unit-containing polymer (E) was over 20 part, had low moldability.

Moreover, the carbon fiber-reinforced thermoplastic resin composition of the comparative example 16 including the graft copolymer (A), the matrix polymer (B), the inorganic filler (D), the glycidyl ether unit-containing polymer (E), and the carboxyl group-containing wax instead of the glycidyl ether unit-containing polymer (E), had high falling ball impact strength but lacked the mechanical strengths and the surface appearance.

Industrial Applicability

The reinforced thermoplastic resin composition of the present invention has excellent moldability, processability, and mechanical strengths, as well as being capable of improving the drop impact resistance (falling ball impact strength) of the molded article.

In addition, the molded article of the present invention has excellent processability and mechanical strengths, as well as having higher drop impact resistance (falling ball impact strength). Therefore, the present invention is useful as a material for a housing of a laptop personal computer, a portable device, or the like.

What is claimed is:

1. A reinforced thermoplastic resin composition comprising:

10 to 60% by mass of a graft copolymer (A) in which a graft chain (A2) comprising an aromatic alkenyl compound monomer unit (a) and a vinyl cyanide compound monomer unit (b) is grafted to a rubber polymer (A1);

40 to 90% by mass of a matrix polymer (B) which comprises one or more types of polymers selected from the group consisting of a vinyl-based copolymer (B-1) comprising an aromatic alkenyl compound monomer unit (a) and a vinyl cyanide compound monomer unit (b), a polycarbonate resin (B-2), and a polyester resin (B-3) provided that a total amount of a component of (A) and a component of (B) accounts for 100% by mass;

0.1 to 50 parts by mass of an inorganic filler (D) relative to 100 parts by mass of a total amount of the graft copolymer (A) and the matrix polymer (B); and 0.5 to 20 parts by mass of a glycidyl ether unit-containing polymer (E) which comprises a glycidyl ether unit and has a mass average molecular weight of 50,000 to 60,000.

2. A reinforced thermoplastic resin composition according to claim 1, wherein the inorganic filler (D) is a carbon fiber.

3. The reinforced thermoplastic resin composition according to claim 1, wherein the glycidyl ether type epoxy resin (E) is at least one member selected from the group consisting is bisphenol type epoxy resins, novolac type epoxy resins, polyglycidyl ethers of aliphatic polyhydric alcohols, and biphenyl type epoxy resins, which have a polymer of repetitive units represented by the following formula (1):

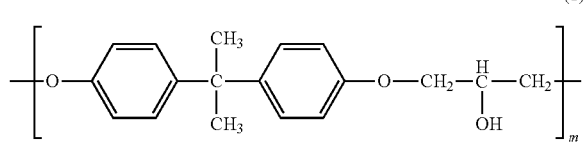

(1)

wherein m represents an integer of 1 or greater.

4. A reinforced thermoplastic resin composition comprising:
- 10 to 40% by mass of a graft copolymer (A) in which a graft chain (A2) comprising an aromatic alkenyl compound monomer unit (a) and a vinyl cyanide compound monomer unit (b) is grafted to a rubber polymer (A1);
- 60 to 90% by mass of a matrix polymer (B) which comprises one or more types of polymers selected from the group consisting of a vinyl-based copolymer (B-1) comprising an aromatic alkenyl compound monomer unit (a) and a vinyl cyanide compound monomer unit (b), a polycarbonate resin (B-2), and a polyester resin (B-3) provided that a total amount of a component of (A) and a component of (B) accounts for 100% by mass;
- 0.1 to 50 parts by mass of an inorganic filler (D) relative to 100 parts by mass of a total amount of the graft copolymer (A) and the matrix polymer (B);
- 0.5 to 20 parts by mass of a glycidyl ether type epoxy resin (E) which comprises a glycidyl ether unit and has a mass average molecular weight of 50,000 to 60,000; and
- 0.1 to 40 parts by mass of a phosphate ester-based flame-retardant agent (F).

5. The reinforced thermoplastic resin composition according to claim 4, wherein a molecular weight of the phosphate ester-based flame-retardant agent (F) is higher than 326 and lower than 692.

6. A reinforced thermoplastic resin composition according to claim 4, wherein the inorganic filler (D) is a carbon fiber.

7. The reinforced thermoplastic resin composition according to claim 4, wherein the glycidyl ether type epoxy resin (E) is at least one member selected from the group consisting of bisphenol type epoxy resins, novolac type epoxy resins, polyglycidyl ethers of aliphatic polyhydric alcohols, and biphenyl type epoxy resins, which have a polymer of repetitive units represented by the following formula (1):

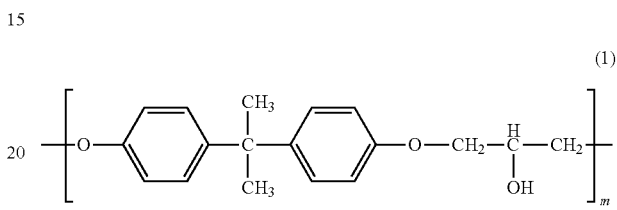

(1)

wherein m represents an interger of 1 or greater.

8. A molded article formed through molding processing of the reinforced thermoplastic resin composition according to claim 1.

9. A molded article formed through molding processing of the reinforced thermoplastic resin composition according to claim 4.

\* \* \* \* \*